United States Patent [19]
Sutton

[11] 3,801,829
[45] Apr. 2, 1974

[54] FREQUENCY DETECTING CIRCUIT WITH BUILT-IN TESTING ARRANGEMENT

[75] Inventor: Christopher John Sutton, Tamworth, England

[73] Assignee: Girling Limited, Tyseley, Birmingham, England

[22] Filed: Feb. 5, 1973

[21] Appl. No.: 329,825

Related U.S. Application Data
[62] Division of Ser. No. 167,411, July 29, 1971.

[52] U.S. Cl. ............ 307/233, 307/271, 307/247 A, 331/113
[51] Int. Cl. ....................................... H03k 5/20
[58] Field of Search .. 328/26; 307/233, 271, 247 H; 331/113

[56] References Cited
UNITED STATES PATENTS
| | | | |
|---|---|---|---|
| 2,983,873 | 5/1961 | Mintzer | 328/26 X |
| 3,417,336 | 12/1968 | Cribbs et al. | 307/233 X |
| 3,471,792 | 10/1969 | Axford | 307/233 X |
| 3,681,621 | 8/1972 | Downs | 307/271 |

Primary Examiner—John S. Heyman
Attorney, Agent, or Firm—Holman & Stern

[57] ABSTRACT

In a frequency detecting circuit, two frequencies are produced, and are converted to d.c. voltages by a pair of frequency to voltage converters. Switch means is then used to connect the output from one or other of the converters to a load. A test facility is provided consisting of two transistors and associated capacitors and windings which, when switches in the circuit are closed, simulate a predetermined frequency.

2 Claims, 1 Drawing Figure

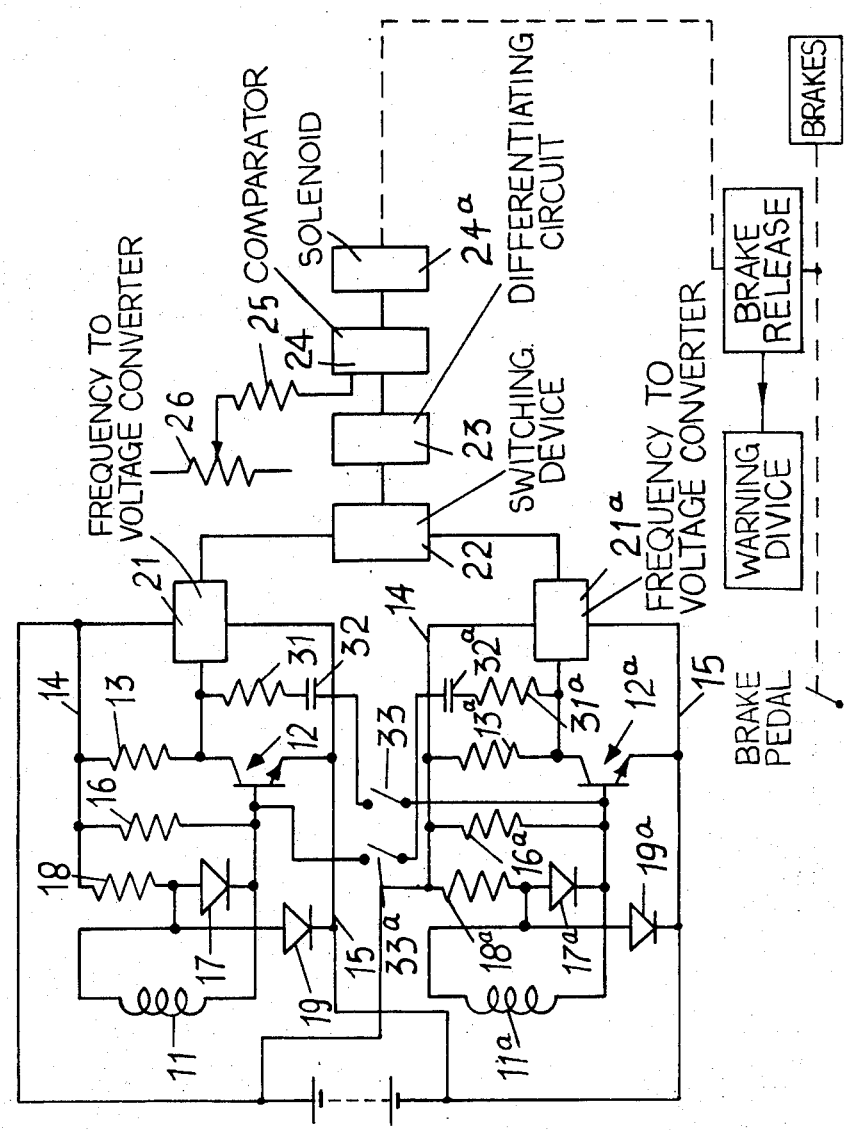

FREQUENCY DETECTING CIRCUIT WITH BUILT-IN TESTING ARRANGEMENT

This case is divided from my application No. 167,411 filed July 29, 1971 and now allowed.

This invention relates to frequency detecting circuits of the kind including a first winding in which is developed an a.c. signal representing a first frequency, a first transistor which is turned on and off by said signal, a first frequency to voltage converter for producing a voltage representing said first frequency, a second winding in which is developed a second a.c. signal representing a second frequency, a second transistor which is turned on and off by the second signal, a second frequency to voltage converter for producing a voltage representing said second frequency, and switch means for connecting the output from one or other of said converters to a load.

One example of such a circuit is in an anti-skid system for a vehicle, particularly a road vehicle. The two frequencies measured represent the speeds of two wheels of the vehicle, the wheels being on a common axle, and the switch means connects the output from the slowest wheel to the load, it being appreciated that the slowest wheel is the most likely to skid. The load consists of a differentiating circuit which produces an output representing the deceleration of the wheel, together with a comparator which compares this output with a signal representing what is regarded as a maximum safe deceleration without wheel slip occurring. If the deceleration exceeds the closen value, the brakes are released from the wheel. However, although the invention is particularly designed for use with such a system, it can be used in any other arrangements in which two frequencies are detected, and on or other of the frequencies is applied to a load, which can be of any form and could for example be an instrument indicating the frequency in question.

The purpose of the invention is to provide in a circuit of the kind specified means for testing the circuit.

The two transistors referred to can actually be parts of the first and second frequency to voltage converters respectively.

The accompanying drawing is a circuit diagram illustrating one example of the invention as applied to an anti-skid system for a road vehicle.

Referring to the drawing, one wheel of a road vehicle drives a generator producing in a pick-up winding 11 an a.c. signal at a frequency proportional to the speed of the wheel. One end of the winding 11 is connected to the base of an n-p-n transistor 12, the collector of which is connected through a resistor 13 to a positive supply line 14, and the emitter of which is connected to a negative supply line 15. The base of the transistor 12 is further connected to the line 14 through a resistor 16, and is also connected to the cathode of a diode 17, the anode of which is connected to the line 14 through a resistor 18. The other end of the winding 11 is connected to the junction of the resistor 18 and diode 17, and is further connected through a diode 19 to the line 15.

The transistor 12 is biased to a conductive state by current flow through the resistor 16, and is turned on and off by the signal developed in the winding 11. The collector of the transistor 12 is connected to a frequency to voltage converter 21, of which the transistor 12 forms part, and the output from the converter 21 is a voltage representing the speed of the wheel. The diode 19 is forward biased by current flow from the positive supply rail 14, through resistor 18. The forward volt drop across the diode 19 then nearly equals the transistor 12 base-emitter voltage. This makes the circuit more sensitive and only 200 to 300 mv of signal are required from the pick-up coil to switch transistor 12 on.

The diode 17 is provided to protect the transistor 12 base-emitter junction against excessive reverse voltage.

It will be appreciated that the pick-ups used have an output voltage proportional to speed for most of the speed range, so that the output voltage at rest is zero. A small output voltage typically ½ volt, is produced at 2 to 3 m.p.h., and as much as 35 to 40 volts are produced at speed of 40 to 50 m.p.h. Thus the circuit must be sensitive to the lower speed output voltages, but must not be damaged at high speeds by high voltages. The pick-ups are chosen to have high impedances and hence short circuit current protection is used.

A second wheel on the same axle operates a second generator, having a pick-up winding 11a associated therewith. The signal developed in the winding 11a controls the output of another frequency to voltage converter 21a through the intermediary of components similar to those associated with the winding 11, and indicated by the same reference numerals but with the suffix a. The lines 14 and 15 can of course be common to the two circuits. It will be appreciated that the frequency to voltage converters 21 and 21a are entirely conventional, as will be appreciated by those skilled in the art. Conventional diode pump circuits are suitable, as are conventional transistor pump circuits. An example of a transistor pump circuit is shown in U.S. Pat. No. 3,202,938.

The converters 21 and 21a are connected through a switching device 22 to a differentiating circuit 23, the output from which is fed to a comparator 24 which also receives a reference signal by way of a resistor 25 from the variable point on a resistor 26. The output from the comparator 24 operates a solenoid 24a which when energised releases the brakes.

In use, the switching device 22 passes to the differentiating circuit 23 the signal representing the frequency of the slowest wheel. The differentiating circuit 23 produces an output representing the deceleration of this wheel, and if the deceleration exceeds a value set by the comparator 24, then the brakes are released and held off for a predetermined period of time, and then re-applied, after which the cycle is repeated if the deceleration is still too rapid.

The collector of the transistor 12 is connected through a resistor 31, a capacitor 32 and a switch 33 in series to the base of the transistor 12a. Similarly, the collector of the transistor 12a is connected through a resistor 31a, a capacitor 32a and a switch 33a to the base of the transistor 12, the switches 33 and 33a being ganged for simultaneous operation. Normally, the switches 33 and 33a are open, but when it is desired to test the circuit, the switches 33 and 33a are closed, providing capacitive cross-coupling between the collectors and bases of the transistors 12 and 12a, and connecting these transistors, together with the capacitors 32 and 32a and the winding 11 and 11a, across the supply lines 14 and 15 in the manner of a standard multi-vibrator which oscillates at a frequency determined by the capacitors and the windings. If for any reason one of the windings 11 or 11a does not have the correct pick-up impedance (for example if it is shorted or open-circuited), then of course the circuit will not oscillate, and so an indication will be given that one of the windings if faulty. However, assuming that the windings are satisfactory, then a signal will be fed to the differentiating circuit 23 representing a constant wheel speed, which typically would be of the order of 50 m.p.h. When the switches 33 and 33a are opened again, the signal fed to the differentiating circuit 23 becomes zero, and so the differentiating circuit behaves as if the vehicle has decelerated from 50 m.p.h. to zero in zero time. Inevitably, such a rapid deceleration will operate the comparator 24 to release the brakes, and a warning lamp or other device is incorporated to indicate to the driver that the solenoid 24a has been energised. The brakes need not necessarily be applied at this time of course, and conveniently the switches 33 and 33a are combined with the ignition switch of the vehicle, so that every time the vehicle is started the switches 33 and 33a will be closed and then opened, so that a momentary energisation of the warning device will result, indicating to the driver that his anti-skid system is operative.

I claim:

1. A frequency detecting circuit comprising in combination a first winding in which in use is developed a first a.c. signal representing a first frequency, a first transistor, circuit means coupling said first transistor to said first winding, said first transistor being turned on and off by said first a.c. signal, a first frequency to voltage converter, circuit means coupling said first frequency to voltage converter to said first transistor, said first frequency to voltage converter producing an output voltage representing said first frequency, a second winding in which in use is developed a second a.c. signal representing a second frequency, a second transistor, circuit means coupling said second transistor to said second winding, said second transistor being turned on and off by said second signal, a second frequency to voltage converter, circuit means coupling said second frequency to voltage converter to said second transistor, said second frequency to voltage converter producing an output voltage representing said second frequency, a load, and switch means for connecting the output from one or the other of said converters to said load, said frequency detecting circuit further incorporating a built-in testing arrangement, said testing arrangement including a first capacitor and a first normally open switch connected in series between the collector of the first transistor and the base of the second transistor, and a second capacitor and a second normally open switch connected in series between the base of the first transistor and the collector of the second transistor, closing of the first and second switches resulting in the transistor and capacitors acting as a multi-vibrator operating at a set frequency to produce in the said load an output representing said set frequency for testing purposes.

2. A circuit as claimed in claim 1 in which the two transistors are parts of the first and second frequency to voltage converters respectively.

* * * * *